United States Patent
Chang

(10) Patent No.: US 9,996,699 B2
(45) Date of Patent: Jun. 12, 2018

(54) METHOD, ELECTRONIC DEVICE AND COMPUTER PROGRAM PRODUCT FOR SCREEN SHIELD

(71) Applicant: Wistron Corp., New Taipei (TW)

(72) Inventor: Wei Chen Chang, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days. days.

(21) Appl. No.: 14/322,793

(22) Filed: Jul. 2, 2014

(65) Prior Publication Data

US 2015/0213280 A1   Jul. 30, 2015

(30) Foreign Application Priority Data

Jan. 29, 2014 (TW) .............................. 103103419 A

(51) Int. Cl.
| | |
|---|---|
| *G06F 21/60* | (2013.01) |
| *G06F 21/62* | (2013.01) |
| *G06F 21/74* | (2013.01) |
| *G06F 21/70* | (2013.01) |
| *H04W 12/02* | (2009.01) |
| *H04W 88/02* | (2009.01) |

(52) U.S. Cl.
CPC ............ *G06F 21/604* (2013.01); *G06F 21/62* (2013.01); *G06F 21/6245* (2013.01); *G06F 21/6254* (2013.01); *G06F 21/70* (2013.01); *G06F 21/74* (2013.01); *H04W 12/02* (2013.01); *G06F 2221/2149* (2013.01); *H04W 88/02* (2013.01)

(58) Field of Classification Search
CPC .. G06F 21/62; G06F 21/6245; G06F 21/6254; G06F 21/70; G06F 21/74; G06F 21/82; G06F 21/84
See application file for complete search history.

(56) References Cited

U.S. PATENT DOCUMENTS

| | | | |
|---|---|---|---|
| 2007/0196593 | A1 | 8/2007 | Kim |
| 2007/0256032 | A1* | 11/2007 | Petri ................... G06F 3/04812 715/856 |
| 2008/0025645 | A1* | 1/2008 | Jakobson et al. ............. 382/300 |
| 2009/0300554 | A1* | 12/2009 | Kallinen ............. G06F 3/04883 715/863 |

(Continued)

FOREIGN PATENT DOCUMENTS

| | | |
|---|---|---|
| CN | 1929602 B | 9/2010 |
| CN | 101872348 A | 10/2010 |
| TW | 341688 | 10/1998 |

OTHER PUBLICATIONS

Taiwan Patent Office, Office Action, Patent Application Serial No. 103103419, dated Apr. 17, 2015, Taiwan.

(Continued)

*Primary Examiner* — Samson Lemma
*Assistant Examiner* — Arya Golriz

(57) ABSTRACT

The present disclosure provides a screen shielding method, applied to a display device of an electronic device, wherein the display device has a display region, and the electronic device is arranged to execute a plurality of applications. The screen shielding method includes determining whether a first predetermined input signal has been received when a first application of the plurality of applications has been executed in the foreground, and producing a privacy block in response to the first predetermined input signal for entering a privacy protect mode.

17 Claims, 11 Drawing Sheets

(56) References Cited

U.S. PATENT DOCUMENTS

| | | | | |
|---|---|---|---|---|
| 2010/0110105 A1* | 5/2010 | Kinnunen | ............... | G01C 21/20 |
| | | | | 345/629 |
| 2012/0124505 A1* | 5/2012 | St. Jacques, Jr. | ...... | G06F 3/0483 |
| | | | | 715/776 |
| 2013/0132906 A1* | 5/2013 | Siurumaa | ............... | G06F 3/0488 |
| | | | | 715/835 |
| 2014/0113611 A1* | 4/2014 | Ye | ........................ | H04L 47/2475 |
| | | | | 455/418 |

OTHER PUBLICATIONS

China Patent Office, Office Action, Patent Application Serial No. 201410056316.2, dated Apr. 28, 2017, China.

* cited by examiner

METHOD, ELECTRONIC DEVICE AND COMPUTER PROGRAM PRODUCT FOR SCREEN SHIELD

CROSS REFERENCE TO RELATED APPLICATIONS

This Application claims priority of Taiwan Patent Application No. 103103419, filed on Jan. 29, 2014, the entirety of which is incorporated by reference herein.

BACKGROUND OF THE DISCLOSURE

Field of the Disclosure

The present disclosure relates to a screen shielding method applied to an electronic device, and in particular, to a screen shielding method supporting a plurality of applications simultaneously.

Description of the Related Art

Presently, mobile devices are highly developed and multi-functional. For example, handheld devices such as mobile phones and tablets are capable of conducting telecommunication services, receiving and transmitting e-mails, maintaining social networks, managing contacts, and playing media. Hence, users can implement various applications on their mobile devices, such as phone call, social network, or commercial applications. Therefore, mobile devices have become one of the necessities in people's lives, and the likelihood that private information will be displayed on the handheld devices has increased. Privacy protection of users has become an important issue.

BRIEF SUMMARY OF THE DISCLOSURE

A detailed description is given in the following embodiments with reference to the accompanying drawings.

The present disclosure provides a screen shielding method, applied to a display device of an electronic device, wherein the display device has a display region, and the electronic device is arranged to execute a plurality of applications. The screen shielding method includes determining whether a first predetermined input signal has been received when a first application of the plurality of applications has been executed in the foreground, and producing a privacy block in response to the first predetermined input signal for entering a privacy protect mode.

The present disclosure also provides an electronic device arranged to execute a plurality of applications. The electronic device includes a display device, an input device, a coordinate calculation module and an image processing device. The display device has a display region. The input device is arranged to receive a first predetermined input signal. The coordinate calculation module is arranged to determine a first coordinate in the display region according to the first predetermined input signal, wherein the first coordinate corresponds to a first shielded region of the first application. The storage device is arranged to store the first coordinate. The image processing device is arranged to produce a privacy block and enable the display device to use the privacy block to cover the first shielded region based on the first coordinate for entering a privacy protect mode.

The present disclosure further provides a recording media, arranged to store a plurality of physical computer readable codes used for retrieval and execution by computers for a screen shielding method. The recording media includes a first program code, a second program code and a third program code. The first program code is arranged to determine whether a first predetermined input signal has been received when a first application of a plurality of applications has been executed in the foreground. The second program code is arranged to determine a first coordinate in a display region of a display device according to the first predetermined input signal and store the first coordinate, wherein the first coordinate corresponds to a first shielded region of the first application. The third program code is arranged to use a privacy block to cover the first shielded region based on the first coordinate for entering a privacy protect mode.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1B:
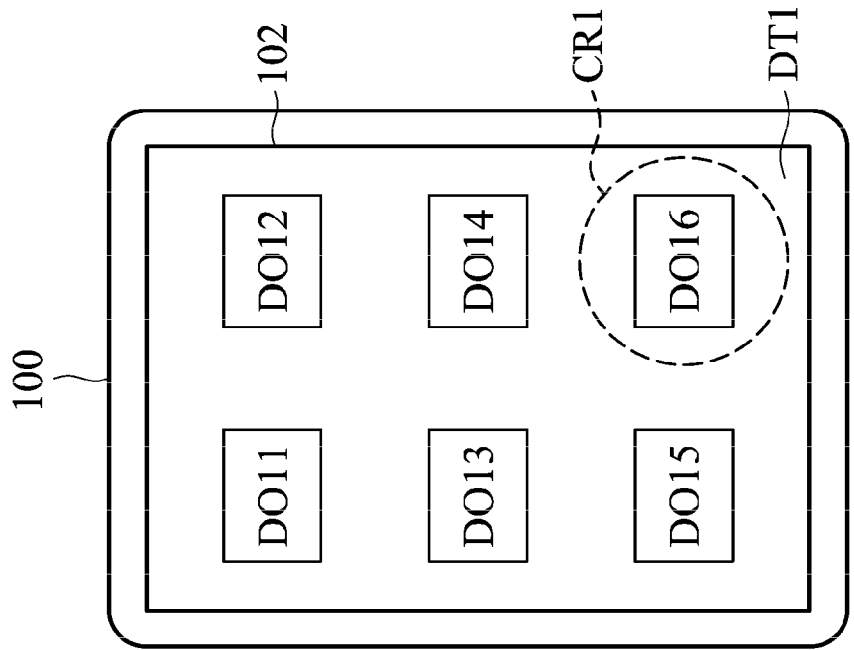
FIG. 1A~1H are schematic diagrams illustrating embodiments of operations of an electronic device of the present disclosure.
Figure 1A:
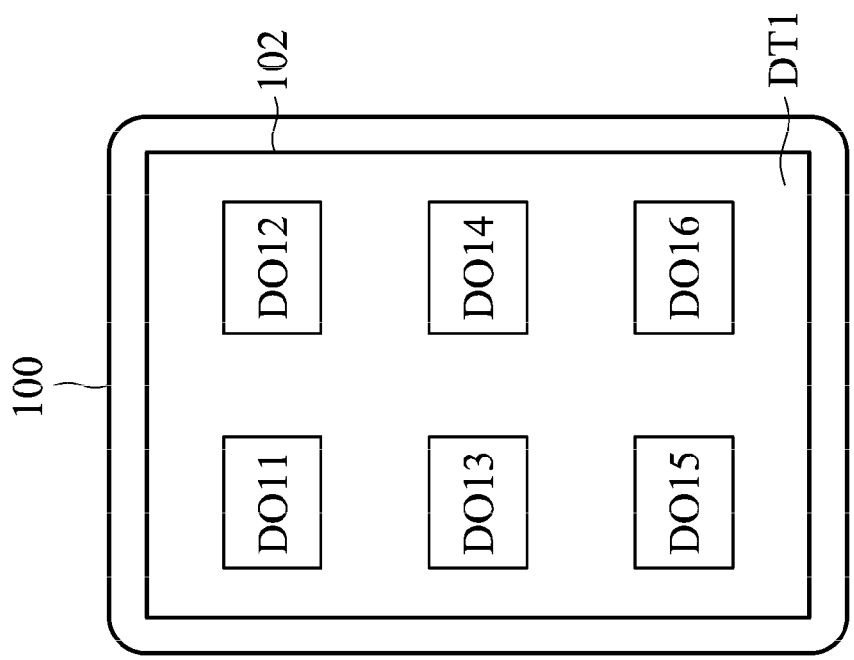

FIG. 1A is a schematic diagram illustrating an embodiment of operating a first application on an electronic device of the present disclosure. As shown in FIG. 1A, the electronic device 100 has a display region 102 arranged to execute a plurality of applications, wherein the screen displayed on the display region 102 is the main screen DT1 of a first application of the plurality of applications, and the first application has been executed in the foreground. The main screen DT1 of the first application includes a plurality of objects DO11-DO16, but it is not limited thereto. The amount and appearance of the objects DO11-DO16 of FIG. 1A is illustrated using one of the applications; however, the present disclosure is not limited thereto. For example, the first application may include objects DO11-DO1N, wherein the objects DO11-DO1N can be pictures, images, characters and/or links, etc. It should be noted that each of the objects DO11-DO1N has an absolute position based on the first application main screen, and a coordinate corresponds to the absolute position of the display region 102. Moreover, FIGS. 1B-1F are schematic diagrams illustrating embodiments of operations of the electronic device of the present disclosure.

Figure 1D:
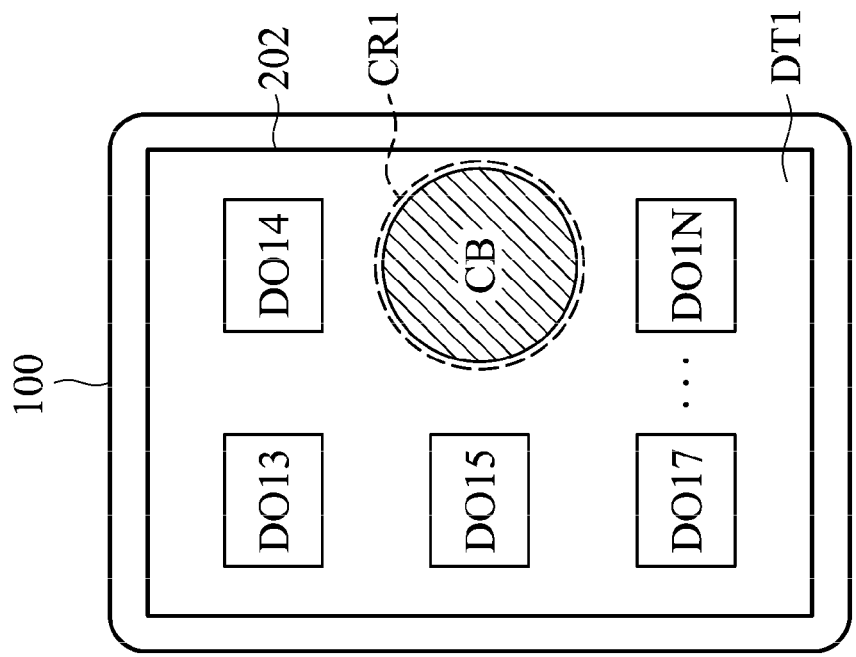
Figure 1C:
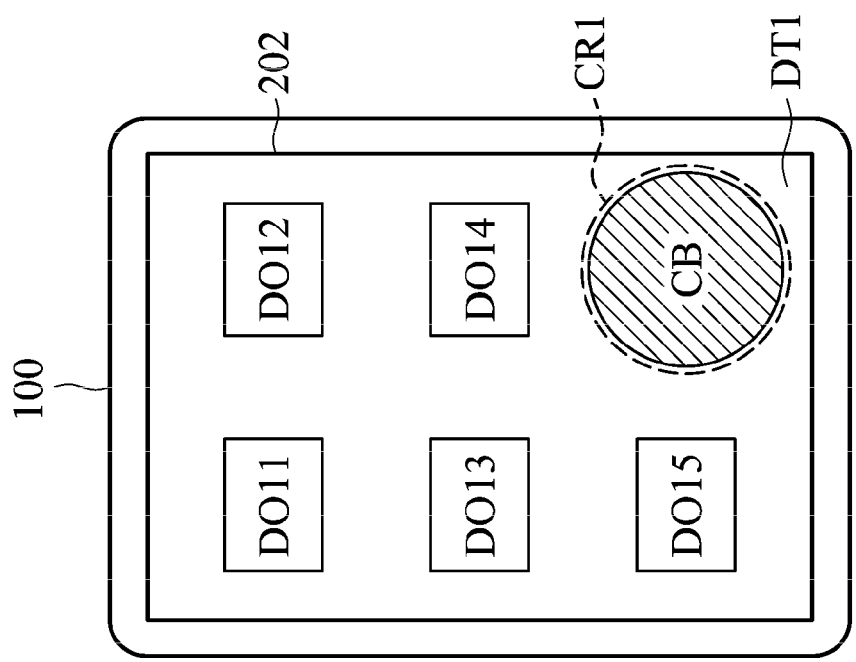
Figure 1F:
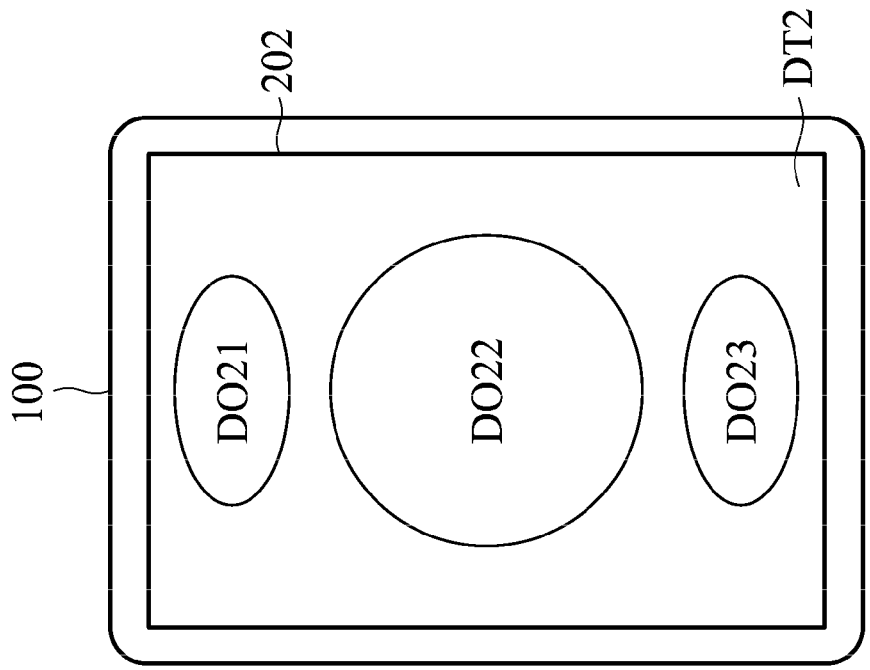
Figure 1E:
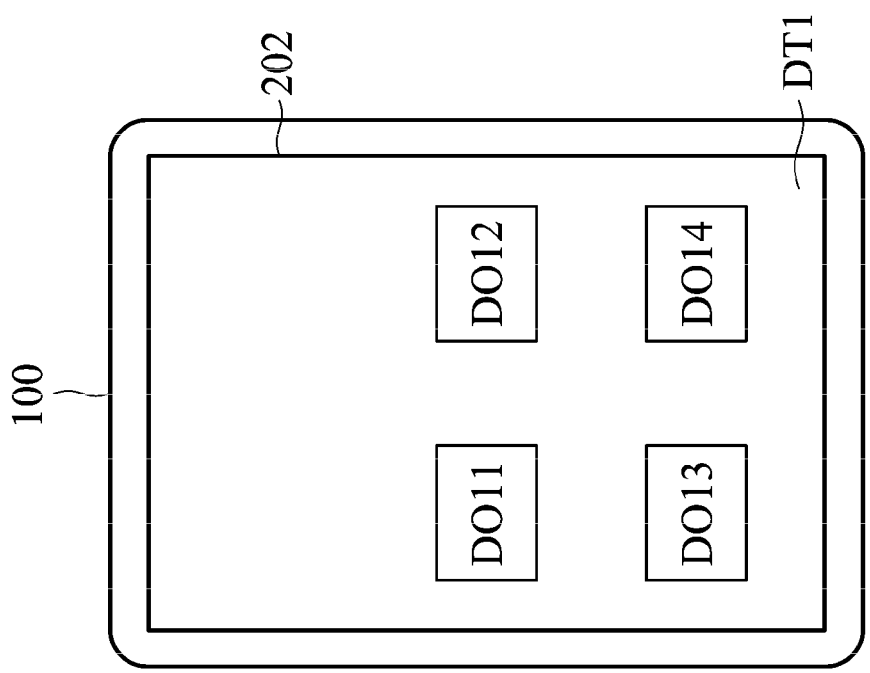
Figure 1H:
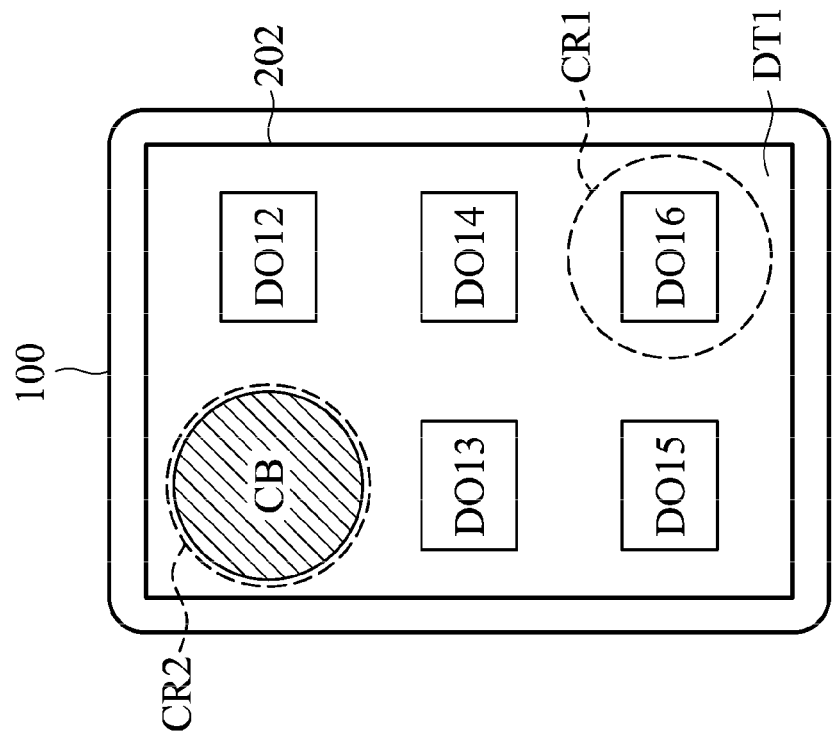
Figure 2:
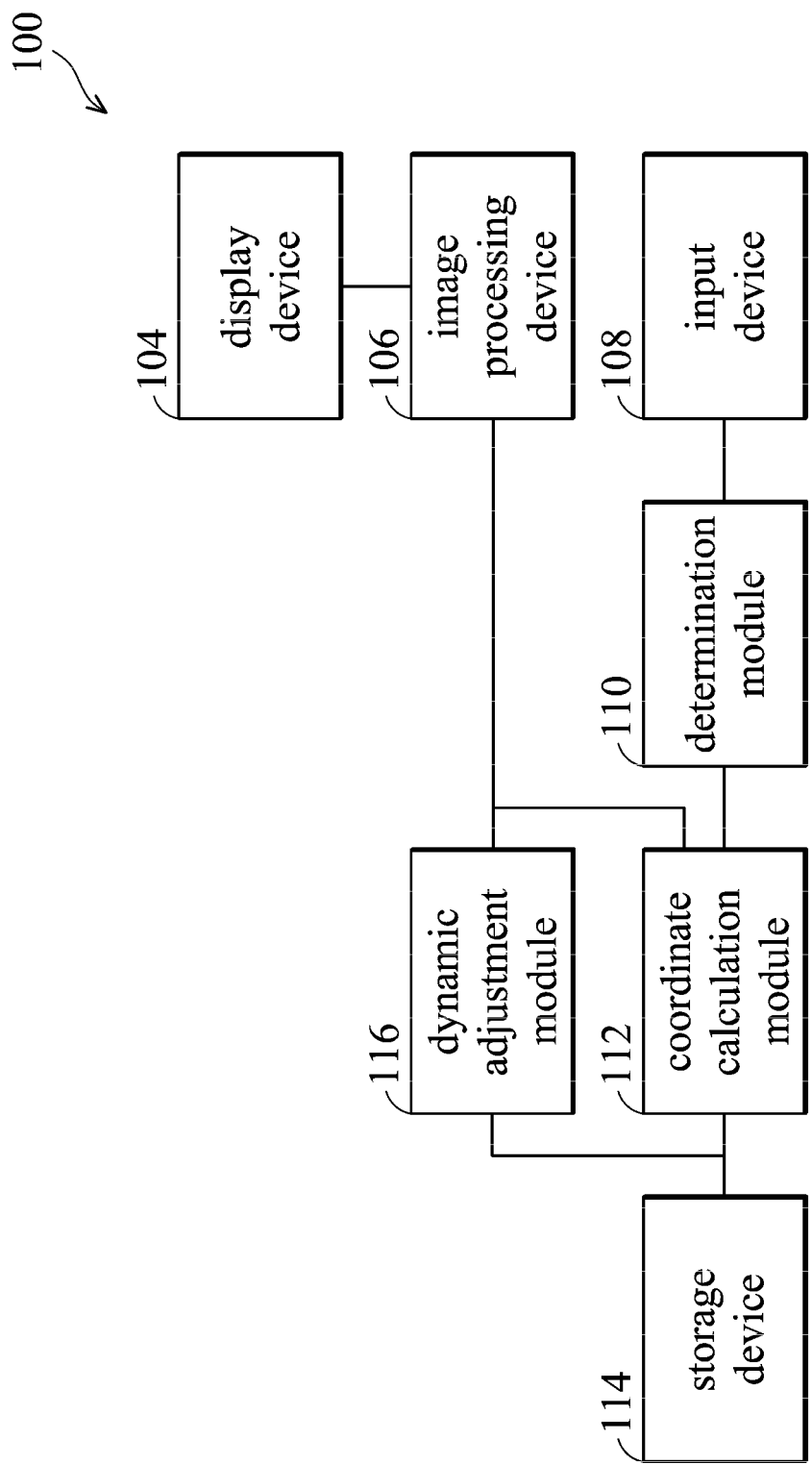
FIG. 2 is schematic diagram illustrating an embodiment of an electronic device of the present disclosure.

Also, reference may be made to FIGS. 1B-1F for operation of the electronic device of FIG. 2.

FIG. 2 is schematic diagram illustrating an embodiment of an electronic device of the present disclosure. Those skilled in the art may implement the electronic display device 100 on a computer configuration, like hand-held devices, portable devices, personal digital assistants (PDA), microprocessor-based or programmable consumer electronics, etc. In one of the embodiments, the electronic device 100 includes a display device 104, an image processing device 106, an input device 108, a determination module 110, a coordinate calculation module 112, a storage device 114 and a dynamic adjustment module 116, but it is not limited thereto. It should be noted that, in some embodiments, the dynamic adjustment module 116 may be deleted from the electronic device 100, and each of the applications executed by the electronic device 100 has a corresponding process identifier, wherein the process identifier is arranged to determine whether the corresponding application has been executed in the foreground or the background of the electronic device 100.

The display device 104 includes a display region 102 arranged to display the main screen of the application executed in the foreground, such as the main screen DT1 of the first application. For example, the display device 104 can be an LCD display, an LED display, or a flexible display, but it is not limited thereto.

The input device 108 is arranged to receive a first predetermined input signal. For example, the input device 108 is a touch device, and the first predetermined input signal is a predetermined gesture, wherein the touch device can be a capacitive touch device, a resistive touch device, or a piezoelectric touch device, but it is not limited thereto. In other embodiments, the input device 108 can be other devices for receiving a user input device, such as a mouse, a touch pad or a keyboard. In one embodiment, the first predetermined input signal is arranged to form a closed area in the display region 102 to define a first shielded region CR1 on the main screen DT1 of the application executed in the foreground by the electronic device 100, as shown in FIG. 1B. In FIG. 1B, when the user does not want others to see the object DO16 of the first application, the user may circle a first shielded region CR1 arranged to cover the object DO16 by inputting the first predetermined input signal through the input device 108. It should be noted that, in another embodiment, the step of circling the first shielded region CR1 has to be performed after the input device 108 receives a predetermined trigger signal to prevent the first predetermined input signal to be read as other operating signals of the first application, but it is not limited thereto. In another embodiment, the input device 108 is further arranged to receive a selection signal arranged to set the appearance of a privacy block CB. Next, the input device 108 receives the first predetermined input signal after setting the appearance of the privacy block CB, and transmits the first predetermined input signal to the coordinate calculation module 112 to determine a first coordinate in the display region 102.

The determination module 110 is arranged to read the signal received by the input device 108, and produce the corresponding command according to the signal received by the input device 108 to enable the other devices of the electronic device 100, such that the other devices of the electronic device 100 can perform calculations or operate in response to the signal received by the input device 108.

The coordinate calculation module 112 is arranged to determine a first coordinate in the display region 102 according to the first predetermined input signal received by the input device 108 after a background protection program is enabled, wherein the first coordinate corresponds to a first shielded region CR1 of the application executed in the foreground, such as the first application. Moreover, the coordinate calculation module 112 is further arranged to store the first coordinate and the corresponding relationship between the first coordinate and the application currently being executed in the foreground in the storage device 114. It should be noted that the first coordinate can include a plurality of coordinates arranged to form the first shielded region CR1, or a coordinate at the center of the first shielded region CR1, but it is not limited thereto. Moreover, an application may include a plurality of first shielded regions CR1, but it is not limited thereto. In another embodiment, the determination module 110 is further arranged to set the appearance of the privacy block CB according to a selection signal after determining the first coordinate in the display region 102, but it is not limited thereto.

The storage device 114 is arranged to store the first coordinate calculated by the coordinate calculation module 112. For example, the storage device 114 may include a memory device (not shown) including a read only memory (ROM), a flash ROM and/or a random access memory (RAM), and the memory may be arranged to store the programs performed by the image processing device 106, the input device 108, the determination module 110, the coordinate calculation module 112 and the dynamic adjustment module 116. Furthermore, the memory may be also arranged to store the coordinate determined by the coordinate calculation module 112 and the privacy block CB. Generally, programs may include routines, programs, applications, objects, components or Web Service elements.

The image processing device 106 is arranged to produce a privacy block CB, and enable the display device 104 to use the privacy block CB to cover the first shielded region CR1 based on the obtained first coordinate to enable the application (the first application) to enter a privacy protect mode. As shown in FIG. 1C, the image processing device 106 enables the display device 104 to using the privacy block CB to cover the first shielded region CR1 based on the first coordinate. Therefore, the object DO16 which the user does not want others to see is covered by the privacy block CB as shown in FIG. 1C. In one of the embodiments, the first predetermined input signal is arranged to form a closed area in the display region 102. Namely, the image processing device 106 may determine a closed area in the display region 102 according to the first predetermined input signal, and produce the privacy block CB according to the appearance of the closed area, but it is not limited thereto. In other embodiments, the privacy block CB can be a default pattern, such as a pattern in the form of a circle, a rectangle or a star, etc., but it is not limited thereto.

The dynamic adjustment module 116 is arranged to perform a dynamic adjustment mechanism to dynamically adjust the position of the privacy block CB to cover the first shielded region CR1 when the main screen DT1 of the first application has been moved. In one embodiment, the dynamic adjustment module 116 is arranged to determine whether the first application has been in the privacy protect mode according to the process identifier. Namely, the dynamic adjustment module 116 is further arranged to determine whether the first application has been executed in the foreground or background at a predetermined time interval. For example, the dynamic adjustment module 116 may search whether the first coordinate corresponding to the application executed in the foreground is stored in the storage device 114 according to the process identifier of the application executed in the foreground, or search whether the storage device 114 has the record representing that the application is in the privacy protect mode, but it is not limited thereto.

When the dynamic adjustment module 116 determines that the application executed in the foreground is in the privacy protect mode, the dynamic adjustment module 116 is further arranged to read the first coordinate stored in the storage device 114, wherein the first coordinate corresponds to the application executed in the foreground. Namely, the dynamic adjustment module 116 is arranged to read the first coordinate stored in the storage device 114 when the dynamic adjustment module 116 determines that the application executed in the foreground is in the privacy protect mode, Next, the dynamic adjustment module 116 enables the coordinate calculation module 112 to set a third coordinate and determine whether the third coordinate is in the display region 102 according to the stored first coordinate and a current operation arranged to move the main screen DT1 of the first application. When the third coordinate is in the display region 102, the dynamic adjustment module 116 is further arranged to enable the image processing device 106 to use the privacy block CB to cover the first shielded region CR1 again based on the third coordinate. It should be noted that the current operation is the variation of the main screen DT1 of the first application from the last update of the privacy block CB. For example, when the input device 108 is a touch device, the current operation is a "sliding-up" or "sliding-down" gesture arranged to enable the main screen to be moved. The dynamic adjustment module 116 may locate the position of the first shielded region CR1 according to the variation of the main screen DT1, such that the dynamic adjustment module 116 may obtain the third coordinate by determining the variation of the main screen DT1 according to the "sliding-up" or "sliding-down" gesture. As shown in FIG. 1D, the main screen DT1 of the first application has been moved upward in response to the current operation of the user. Therefore, the first shielded region CR1 has been moved upward in the display region 202. The dynamic adjustment module 116 may obtain the amount of the movement of the main screen DT1 according to the current operation, and determine the third coordinate corresponding to the first shielded region CR1 according to the amount of the movement. Next, the dynamic adjustment module 116 determines whether the third coordinate corresponding to the first shielded region CR1 is in the display region 202, and enables the image processing device 106 to use the privacy block CB to cover the first shielded region CR1 based on the third coordinate. Moreover, the coordinate calculation module 112 is further arranged to replace the first coordinate stored in the storage device 114 by the third coordinate. It should be noted that the third coordinate can include a plurality of coordinates arranged to form the first shielded region CR1, or a coordinate at the center of the first shielded region CR1, but it is not limited thereto. Moreover, when the third coordinate is not in the display region 102, the dynamic adjustment module 116 removes the privacy block CB, as shown in FIG. 1E. In FIG. 1E, the main screen DT1 of the first application has been moved downward in response to the current operation of the user. Therefore, the first shielded region CR1 is outside of the display region 202. The dynamic adjustment module 116 obtains the amount of movement of the main screen DT1 according to the current operation, and determines the third coordinate that the first shielded region CR1 is arranged to be moved to according to the amount of movement. Next, the first shielded region CR1 is removed when the third coordinate corresponding to the first shielded region CR1 is outside of the display region 202, but it is not limited thereto. In another embodiment, the dynamic adjustment module 116 may maintain the privacy block CB when the third coordinate is not in the display region 102, and remove the privacy block CB in response to a third predetermined input signal inputted by the user. Moreover, the dynamic adjustment module 116 may also maintain the privacy block CB and move the privacy block CB in response to the second predetermined input signal inputted by the user.

When the dynamic adjustment module 116 determines that the application executed in the foreground is not in the privacy protect mode, the dynamic adjustment module 116 checks whether any privacy block CB exists in the display region 102. When the privacy block CB exists in the display region 102, the dynamic adjustment module 116 enables the display device 104 to remove the privacy block CB. Namely, when the dynamic adjustment module 116 determines that the application (such as the first application) which was in the privacy protect mode is executed in the background, the dynamic adjustment module 116 checks whether the display region 102 has any privacy block CB. When the display region 102 has the privacy block CB, the dynamic adjustment module 116 enables the display device 104 to remove the privacy block CB. Namely, when the dynamic adjustment module 116 realizes that the foreground application which was in the privacy protect mode is switched from the foreground to the background, the display device 104 removes the privacy block CB, as shown in FIG. 1F. In FIG. 1F, the second application executed by the electronic device 100 is not in the privacy protect mode, wherein the second application has a plurality of objects DO21-DO23, but it is not limited thereto. In another embodiment, the dynamic adjustment module 116 may maintain the privacy block CB when the dynamic adjustment module 116 determines that the application executed in the foreground is not in the privacy protect mode and has the privacy block CB, and removes the privacy block CB in response to a third predetermined input signal inputted by the user. Moreover, the dynamic adjustment module 116 may also maintain the privacy block CB and move the privacy block CB in response to the second predetermined input signal inputted by the user.

It should be noted that the determination module 110, the coordinate calculation module 112, the dynamic adjustment module 116 and the program modules thereof can be implemented in a processing unit (not shown) or a plurality of processing unit. For example, the processing unit may include a platform controller hub (not shown) between the processer of the processing unit and other devices, such as BIOS memory, an embedded controller, etc. The platform controller hub is arranged to encode/decode data for communication between the processing unit and the other devices, determine the priority of the program executed by the processing unit, and transmit the commands of the processor of the processing unit to the other devices of the electronic device 100.

Figure 1G:
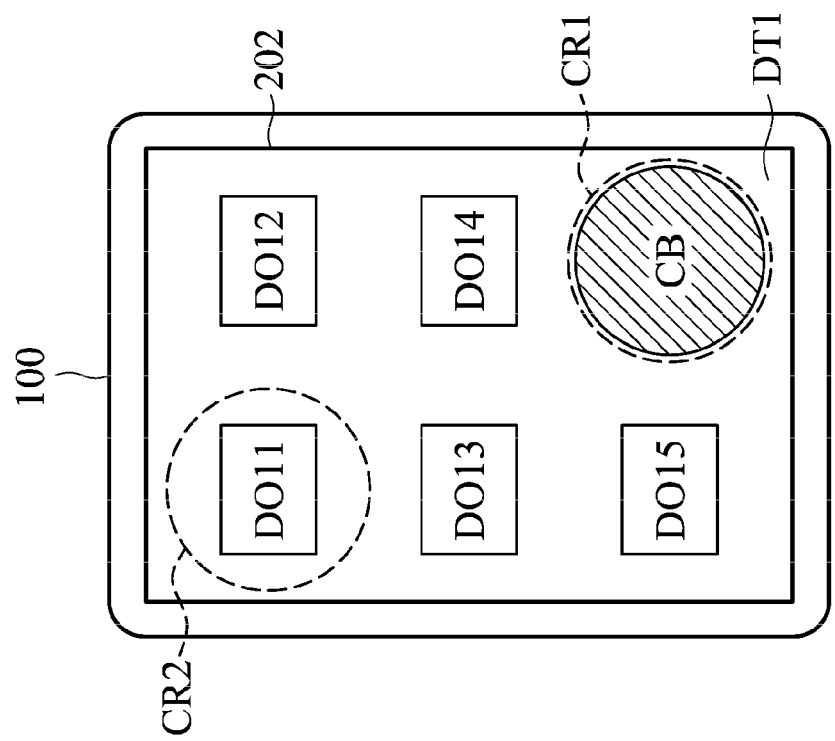

In another embodiment of the present disclosure, the first shielded region CR1 is the area arranged to pre-place the privacy block CB. Namely, the user can produce the privacy block CB on the first shielded region CR1 first, and adjust the position of the privacy block CB in response to the second predetermined input signal for covering the second shielded region CR2 which is the real area that the user does not want others to seen. As shown in FIG. 1G, the privacy block CB is produced on the first shielded region CR1 at first, but the object DO11 which the user does not want others to see is on the second shielded region CR2. In another embodiment, the user may move the privacy block CB from the first shielded region CR1 to the second shielded region CR2 due to the changing of the object arranged to be covered. In this embodiment, the dynamic adjustment module 116 is arranged to determine whether a second predetermined input signal has been received during the dynamic adjustment mechanism. When the second predetermined input signal has been received, the dynamic adjustment module 116 determines a second coordinate according to the second predetermined input signal to determine a second shielded region CR2. It should be noted that the second predetermined input signal is a second predetermined touch gesture, wherein the second predetermined touch gesture is arranged to select and move the privacy block CB. For example, the user may long press or short press the privacy block CB to select the privacy block CB, and drag the privacy block CB to move the privacy block CB from the first coordinate to the second coordinate after selecting the privacy block CB. Next, the dynamic adjustment module 116 enables the image processing device 106 to move the privacy block CB to the second shielded region CR2 based on the second coordinate. Moreover, the coordinate calculation module 112 is further arranged to replace the first coordinate stored in the storage device 114 by the second coordinate. It should be noted that the second coordinate can include a plurality of coordinates arranged to form the second shielded region CR2, or a coordinate at the center of the second shielded region CR2, but it is not limited thereto.

Figure 3A:
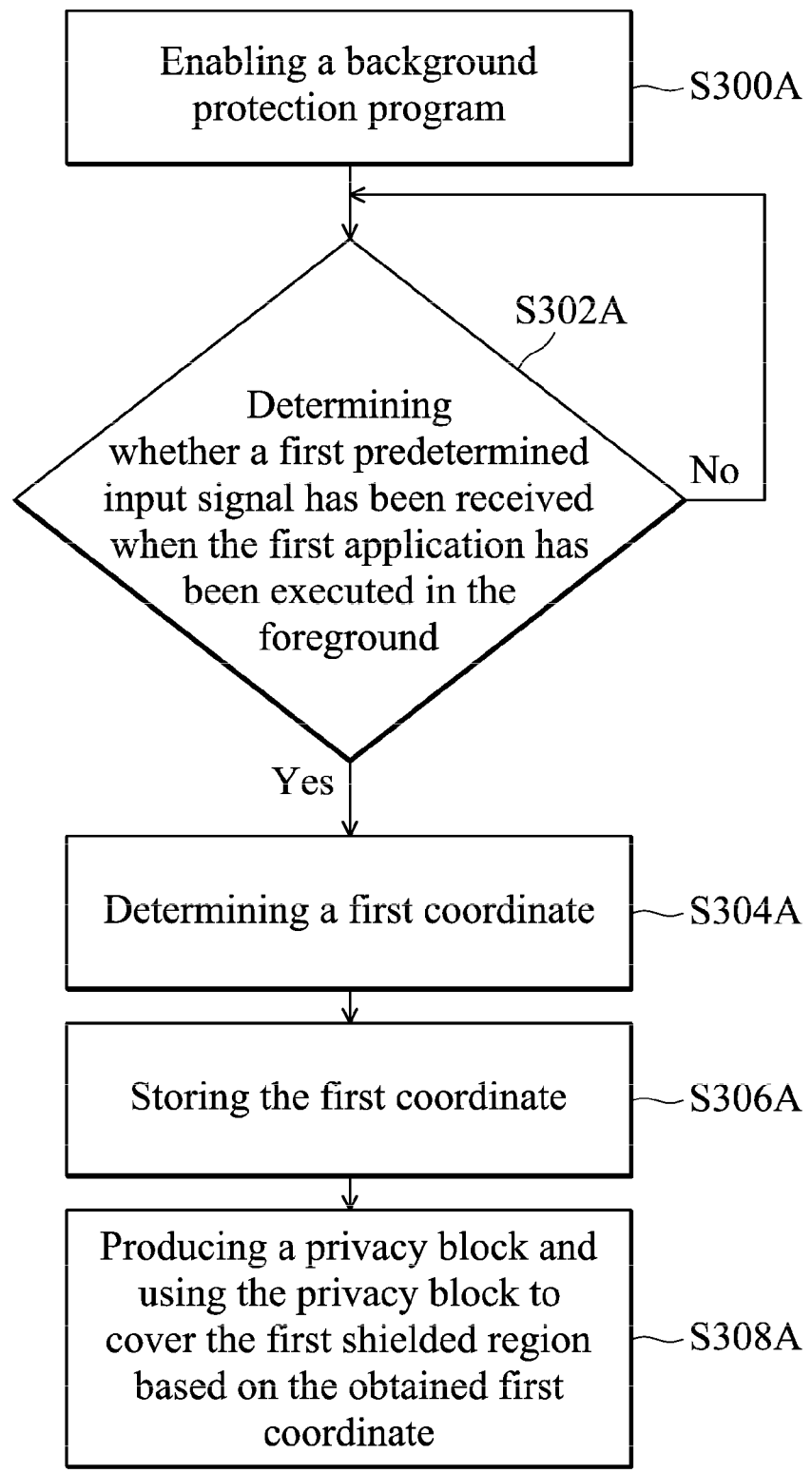
FIG. 3A is a flowchart of a screen shielding method according to an embodiment of the present disclosure.

FIG. 3A is a flowchart of a screen shielding method according to an embodiment of the present disclosure. The screen shielding method of FIG. 3A is applied to the electronic device 100 of FIG. 2, wherein the electronic device 100 is arranged to execute a plurality of applications. The process starts at step S300A.

In step S300A, a background protection program of the electronic device 100 is enabled.

Next, in step S302A, the determination module 110 is arranged to determine whether a first predetermined input signal has been received by the input device 108 when the first application has been executed in the foreground. When the input device 108 receives the first predetermined input signal and while the first application is being executed in the foreground, the process goes to step S304A; otherwise, the determination module 110 continuous to determine whether a first predetermined input signal has been received by the input device 108. It should be noted that the input device 108 is a touch device, and the first predetermined input signal is a predetermined gesture, wherein the touch device can be a capacitive touch device, a resistive touch device, or a piezoelectric touch device, but it is not limited thereto. In other embodiments, the input device 108 can be other devices for receiving a user input device, such as a mouse, a touch pad or a keyboard. In one embodiment, the first predetermined input signal is arranged to form a closed area in the display region to define a first shielded region CR1 on the main screen DT1 of the application executed in the foreground by the electronic device 100, as shown in FIG. 1B, but it is not limited thereto.

In step S304A, the coordinate calculation module 112 is arranged to determine a first coordinate in the display region 102 according to the first predetermined input signal received by the input device 108, wherein the first coordinate corresponds to a first shielded region CR1 of the application such as first application) executed in the foreground. It should be noted that the first coordinate can include a plurality of coordinates arranged to form the first shielded region CR1, or a coordinate at the center of the first shielded region CR1, but it is not limited thereto. Moreover, an application may include a plurality of first shielded regions CR1, but it is not limited thereto. In another embodiment, the determination module 110 is further arranged to set the appearance of the privacy block CB according to a selection signal after determining the first coordinate in the display region 102, but it is not limited thereto.

Next, in step S306A, the coordinate calculation module 112 is arranged to store the first coordinate and the corresponding relationship between the first coordinate and the application currently being executed in the foreground in the storage device 114.

Next, in step S308A, the image processing device 106 is arranged to produce a privacy block CB, and enable the display device 104 to use the privacy block CB to cover the first shielded region CR1 based on the obtained first coordinate to enable the application (the first application) to enter a privacy protect mode. As shown in FIG. 1C, the image processing device 106 enables the display device 104 to use the privacy block CB to cover the first shielded region CR1 based on the first coordinate. Therefore, the object DO16 which the user does not want others to see is covered by the privacy block CB as shown in FIG. 1C. In one of the embodiments, the first predetermined input signal is arranged to form a closed area in the display region 102. Namely, the image processing device 106 may determine a closed area in the display region 102 according to the first predetermined input signal, and produce the privacy block CB according to the appearance of the closed area, but it is not limited thereto. In other embodiments, the privacy block CB can be a default pattern, such as a pattern in the form of a circle, a rectangle or a star, etc., but it is not limited thereto. The process ends at step S308A.

Figure 3B:
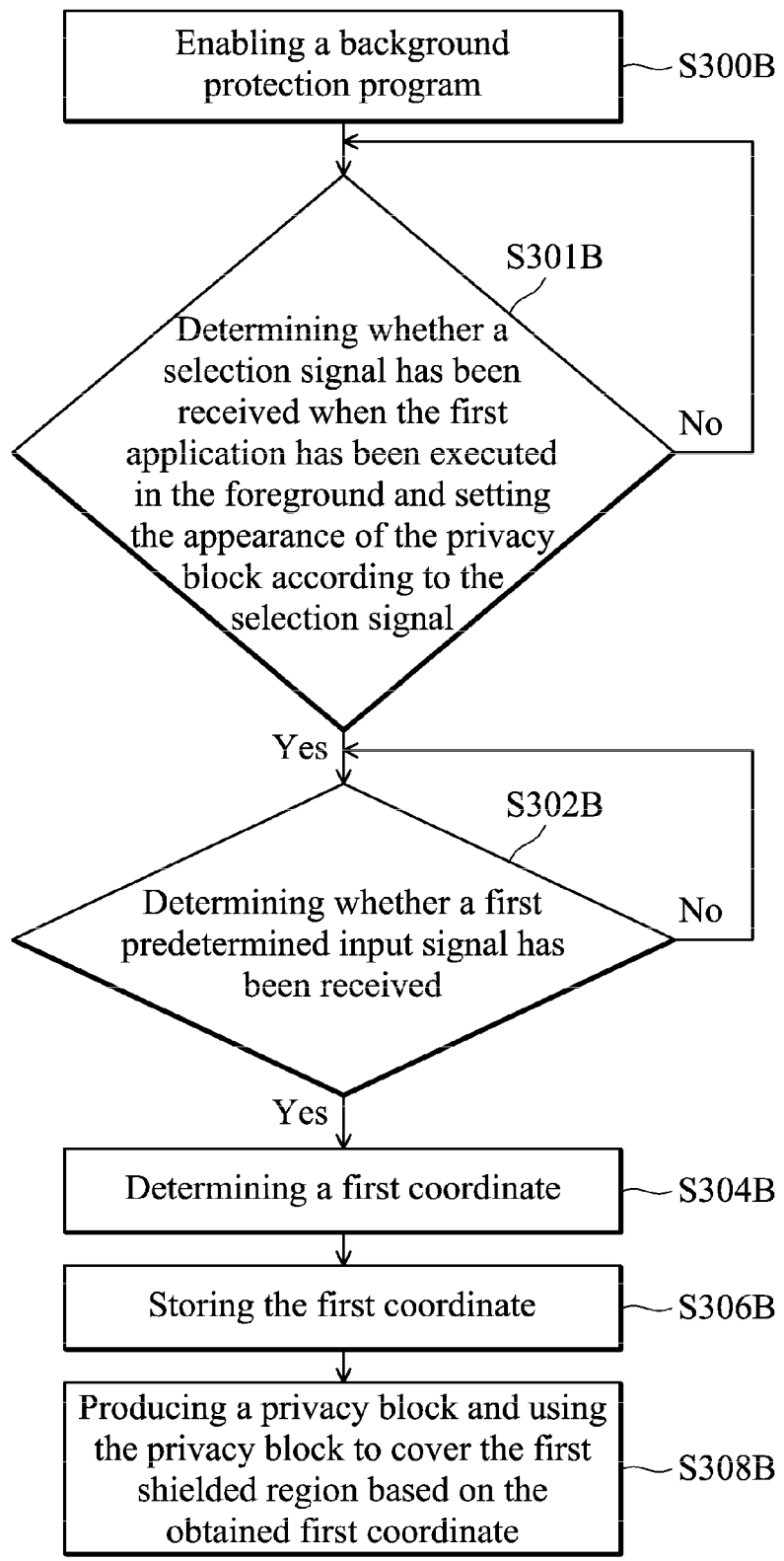
FIG. 3B is a flowchart of a screen shielding method according to another embodiment of the present disclosure.

FIG. 3B is a flowchart of a screen shielding method according to another embodiment of the present disclosure. The screen shielding method of FIG. 3 is applied to the electronic device 100 of FIG. 2, wherein the electronic device 100 is arranged to execute a plurality of applications. The process starts at step S300B. It should be noted that steps S300B, S304B, S306B and S308B are similar to steps S300A, S304A, S306A and S308A. Reference can be made to FIG. 3A for the detailed steps of S300B, S304B, S306B and S308B.

In step S301B, the determination module 110 is arranged to determine whether a selection signal has been received by the input device 108 when the first application has been executed in the foreground, and set the appearance of the privacy block CB according to the selection signal, such as a round, star or rectangular appearance, etc., but it is not limited thereto. When the input device 108 receives the selection signal, the process goes to step S302B; otherwise, the determination module 110 continuous to determine whether a selection signal has been received by the input device 108.

Next, in step S302B, the determination module 110 is arranged to determine whether a first predetermined input signal has been received by the input device 108. When the input device 108 receives the first predetermined input signal and while the first application is being executed in the foreground, the process goes to step S304B; otherwise, the determination module 110 continuous to determine whether a first predetermined input signal has been received by the input device 108.

Figure 4:
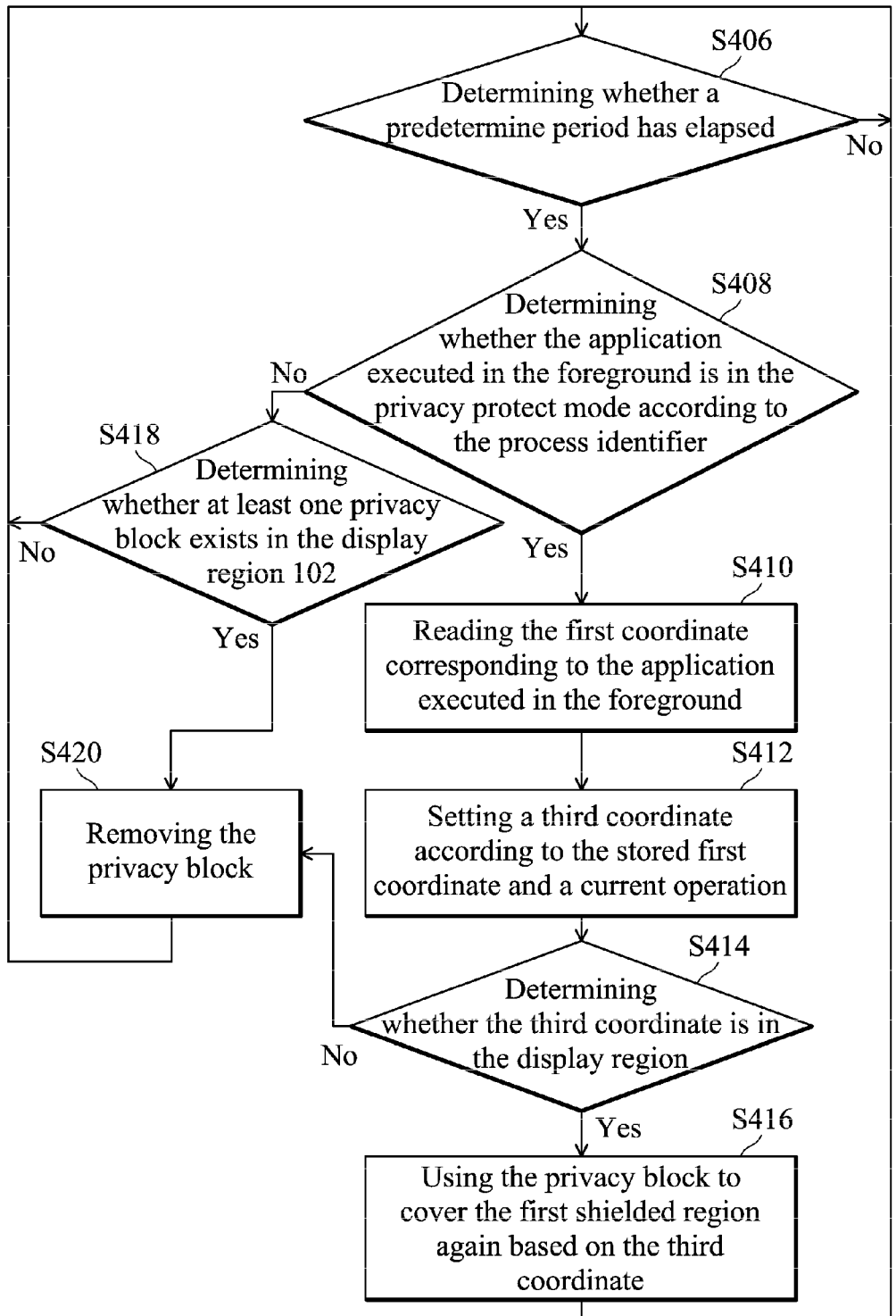
FIG. 4 is a flowchart of a dynamic adjustment mechanism according to an embodiment of the present disclosure.

FIG. 4 is a flowchart of a dynamic adjustment mechanism according to an embodiment of the present disclosure. It should be noted that the electronic device 100 is further arranged to dynamically adjust the position of the privacy block CB to cover the first shielded region CR1 by enabling the dynamic adjustment module 116 to perform the dynamic adjustment mechanism of FIG. 4 after the step S308 of FIG. 3 when the main screen DT1 of the first application has been moved. The process starts at step S406.

In step S406, the dynamic adjustment module 116 is arranged to determine whether a predetermine period has elapsed. When the predetermine period has elapsed, the process goes to step S408; otherwise, the dynamic adjustment module 116 continuous to determine whether a predetermine period has elapsed.

In step S408, the dynamic adjustment module 116 is arranged to determine whether the application executed in the foreground is in the privacy protect mode according to the process identifier. Namely, the dynamic adjustment module 116 is further arranged to determine whether the first application has been executed in the foreground or background at a predetermined time interval. For example, the dynamic adjustment module 116 may search whether the first coordinate corresponding to the application executed in the foreground is stored in the storage device 114 according to the process identifier of the application executed in the foreground, or search whether the storage device 114 has the record representing that the application is in the privacy protect mode, but it is not limited thereto. When the application executed in the foreground is in the privacy protect mode, the process goes to step S410; otherwise, the process goes to step S418.

In step S410, the dynamic adjustment module 116 is arranged to read the first coordinate stored in the storage device 114, wherein the first coordinate corresponds to the application executed in the foreground. Namely, the dynamic adjustment module 116 is arranged to read the first coordinate stored in the storage device 114.

Next, in step S412, the dynamic adjustment module 116 enables the coordinate calculation module 112 to set a third coordinate according to the stored first coordinate and a current operation arranged to move the main screen DT1 of the first application. It should be noted that the current operation is the variation of the main screen DT1 of the first application from the last update of the privacy block CB. For example, when the input device 108 is a touch device, the current operation is a "sliding-up" or "sliding-down" gesture arranged to enable the main screen to be moved. The dynamic adjustment module 116 may locate the position of the first shielded region CR1 according to the variation of the main screen DT1, such that the dynamic adjustment module 116 may obtain the third coordinate by determining the variation of the main screen DT1 according to the "sliding-up" or "sliding-down" gesture. As shown in FIG. 1D, the main screen DT1 of the first application has been moved upward in response to the current operation of the user. Therefore, the first shielded region CR1 is also moved upward in the display region 202. The dynamic adjustment module 116 may obtain the amount of the movement of the main screen DT1 according to the current operation, and determine the third coordinate corresponding to the first shielded region CR1 according to the amount of the movement. Moreover, the coordinate calculation module 112 is further arranged to replace the first coordinate stored in the storage device 114 by the third coordinate. It should be noted that the third coordinate can include a plurality of coordinates arranged to form the first shielded region CR1, or a coordinate at the center of the first shielded region CR1, but it is not limited thereto.

Next, in step S414, the dynamic adjustment module 116 determines whether the third coordinate corresponding to the first shielded region CR1 is in the display region 202. When the third coordinate is in the display region 102, the process goes to step S416; otherwise, the process goes to step S420.

In step S416, the dynamic adjustment module 116 is arranged to enable the image processing device 106 to use the privacy block CB to cover the first shielded region CR1 again based on the third coordinate, as shown in FIG. 1D.

In step S418, the dynamic adjustment module 116 determines whether at least one privacy block CB exists in the display region 102. When the privacy block CB exists in the display region 102, the process goes to step S420; otherwise, the process returns to step S406.

In step S420, the dynamic adjustment module 116 removes the privacy block CB. Next, the process returns to step S406 except that the background protection program is turned off. It should be noted that, in other embodiments, the user may input a signal representing removing the privacy block CB, wherein the signal is inputted by the input device 108. When the input device 108 receives the signal representing removing the privacy block CB, the dynamic adjustment module 116 removes the privacy block CB corresponding to the received signal, but it is not limited thereto. In another embodiment, the dynamic adjustment module 116 may maintain the privacy block CB in step S420, and determine whether the privacy block CB should be removed according to a third predetermined input signal inputted by the user. Moreover, the dynamic adjustment module 116 may maintain the privacy block CB and move the privacy block CB according to the second predetermined input signal inputted by the user.

Figure 5:
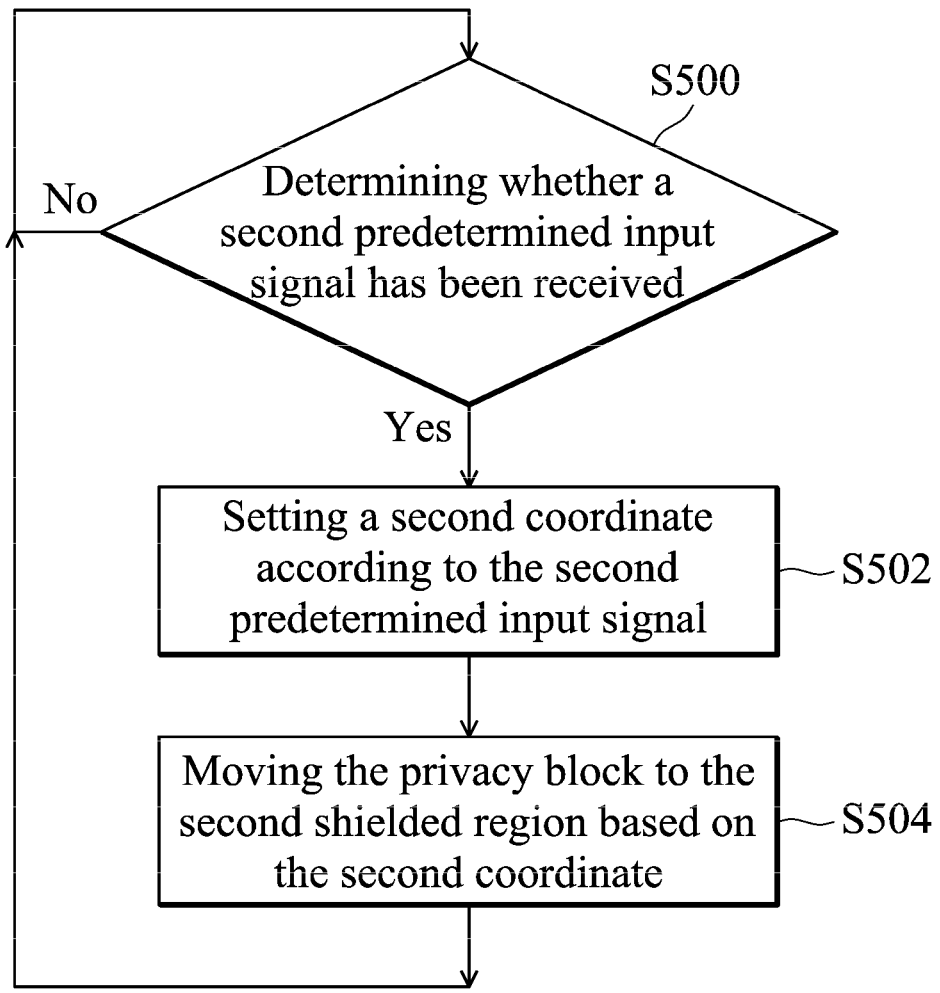
FIG. 5 is a flowchart of a dynamic adjustment mechanism according to another embodiment of the present disclosure.

FIG. 5 is a flowchart of a dynamic adjustment mechanism according to another embodiment of the present disclosure. It should be noted the electronic device 100 is further arranged to perform the dynamic adjustment mechanism of FIG. 5 by the dynamic adjustment module 116 after step S308 of FIG. 3 to dynamically adjust the privacy block CB for covering the second shielded region CR2 according to the second predetermined input signal. The process starts at step S500.

In step S500, the dynamic adjustment module 116 determines whether a second predetermined input signal has been received. When the second predetermined input signal has been received, the process goes to step S502; otherwise, the process returns to step S500, the dynamic adjustment module 116 continuous to determine whether a second predetermined input signal has been received.

In step S502, the dynamic adjustment module 116 sets a second coordinate according to the second predetermined input signal for determining a second shielded region CR2. It should be noted that the second predetermined input signal is a second predetermined touch gesture, wherein the second predetermined touch gesture is arranged to select and move the privacy block CB. For example, the user may long press or short press the privacy block CB to select the privacy block CB, and drag the privacy block CB to move the privacy block CB from the first coordinate to the second coordinate after selecting the privacy block CB. Moreover, the coordinate calculation module 112 is further arranged to replace the first coordinate stored in the storage device 114 by the second coordinate. It should be noted that the second coordinate can include a plurality of coordinates arranged to form the second shielded region CR2, or a coordinate at the center of the second shielded region CR2, but it is not limited thereto.

Next, in step S504, the dynamic adjustment module 116 enables the image processing device 106 to move the privacy block CB to the second shielded region CR2 based on the second coordinate. Next, the step returns to step S500, wherein the dynamic adjustment module 116 continuous to determine whether a second predetermined input signal has been received.

Figure 6A:
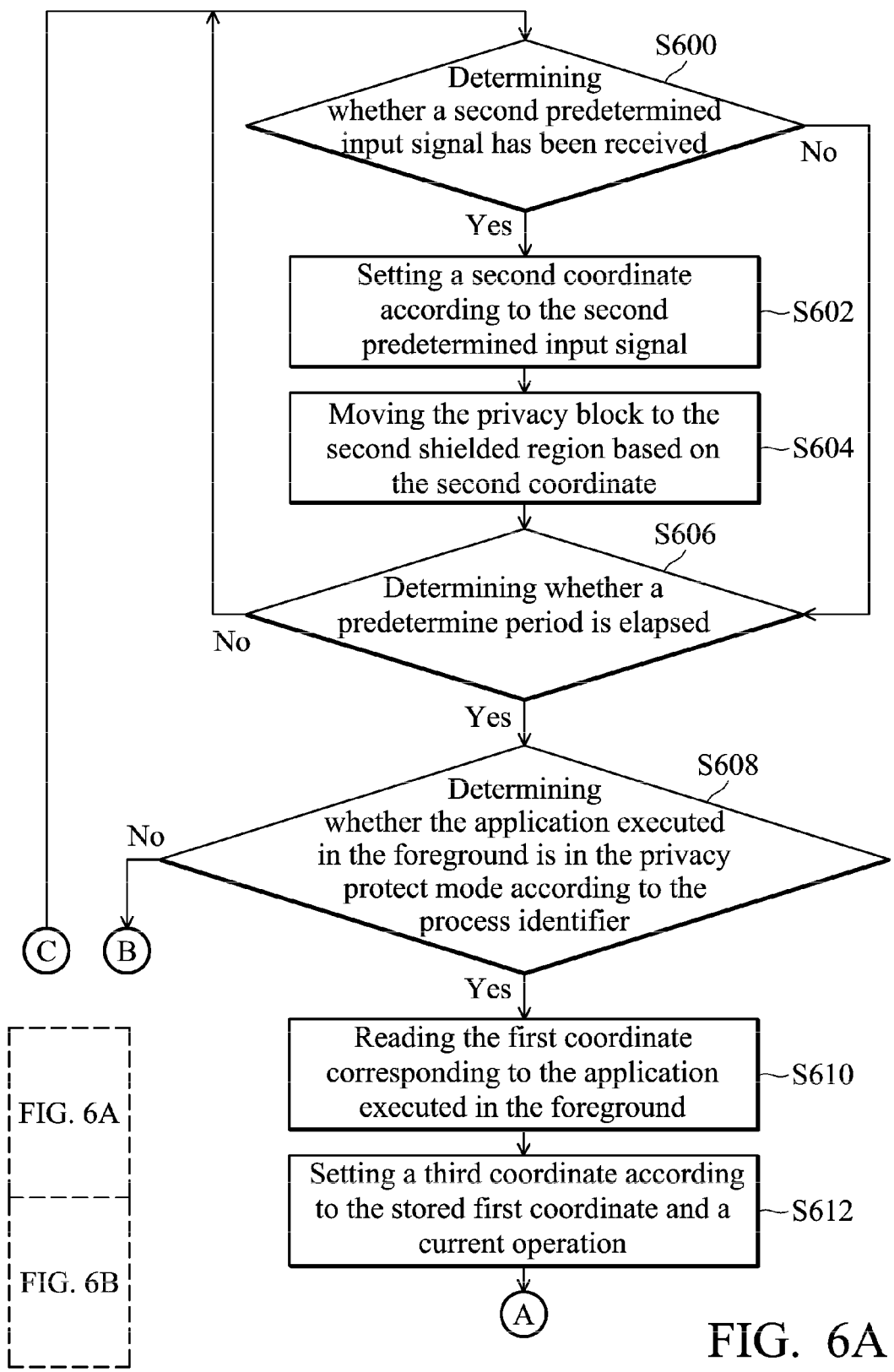
FIG. 6A~6B are a flowchart of a dynamic adjustment mechanism according to another embodiment of the present disclosure.
Figure 6B:
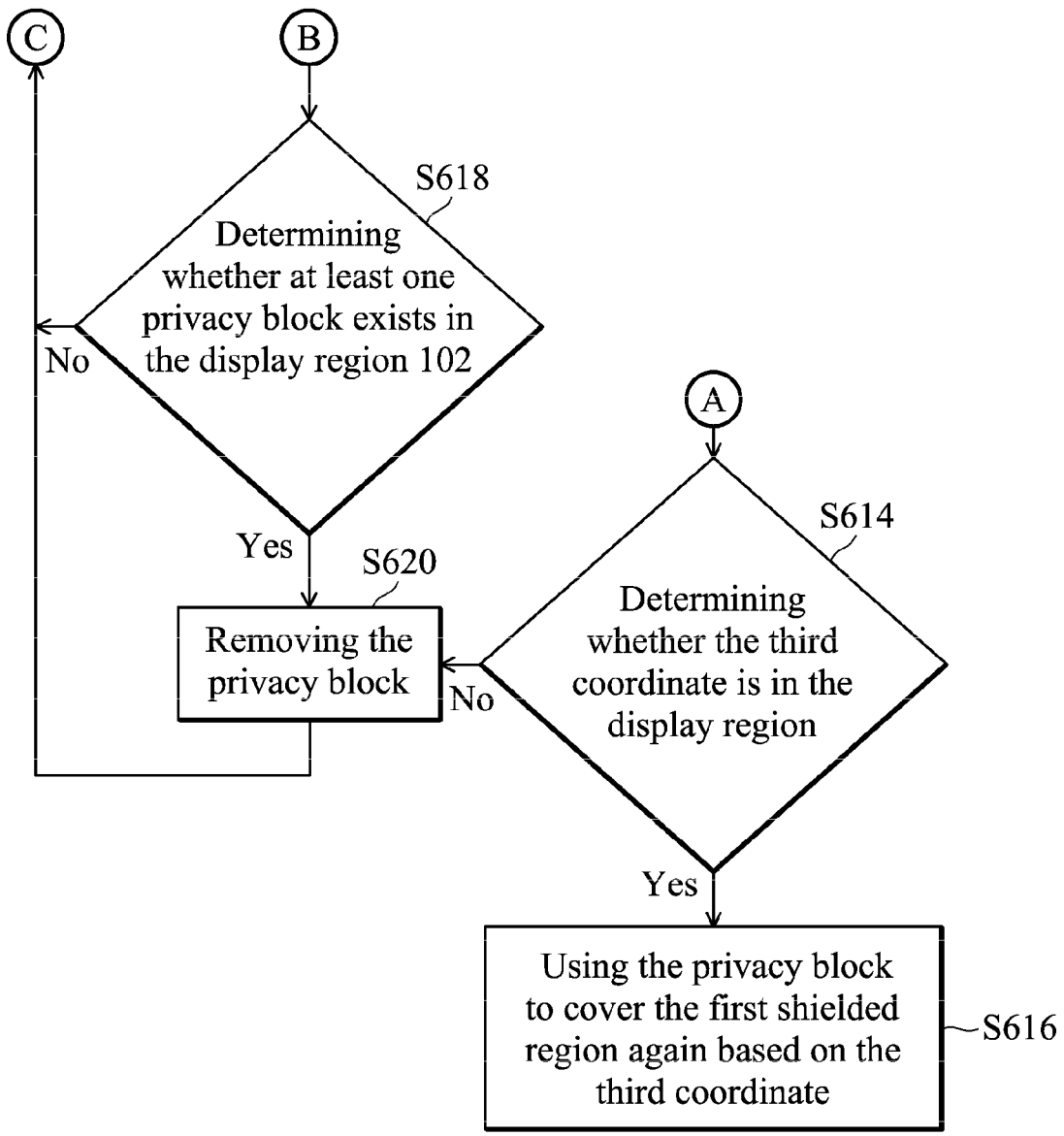

FIG. 6A~6B are a flowchart of a dynamic adjustment mechanism according to another embodiment of the present disclosure. It should be noted that, the electronic device 100 is further arranged to perform the dynamic adjustment mechanism of FIG. 6 by the dynamic adjustment module 116 to dynamically adjust the position of the privacy block CB. The process starts at step S600. It should be noted that the steps S600-S604 are similar to steps S500-S504 of FIG. 5, and steps S606-S620 are similar to steps S406-S420 of FIG. 4. Reference can be made to FIG. 5 for detailed steps of steps S600-S604 and reference can be made to FIG. 4 for detailed steps of steps S606-S620.

It should be noted that the first coordinate, the second coordinate and the third coordinate may be the absolute coordinates of the display region 102 and the relative coordinates of the first application, but it is not limited thereto. In other embodiments, the first coordinate, the second coordinate and the third coordinate may be the absolute coordinates of the first application and the relative coordinates of the display region 102.

The electronic device 100 and the screen shielding method of the present disclosure can protect the privacy of users during operations of applications.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby become an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A screen shielding method, applied to a display device of an electronic device, wherein the display device has a display region and comprises a touch device, and the electronic device is arranged to execute a plurality of applications, the screen shielding method comprising:
   detecting, by a hardware processor, when a first predetermined input signal arranged to enable a first application to enter a privacy protect mode has been received while the first application of the plurality of applications is being executed in the foreground, wherein the first application comprises a main screen including a plurality of objects, and the main screen of the first application occupies the entire display region when the first application is in the foreground;
   producing a privacy block in response to the first predetermined input signal for entering a privacy protect mode, wherein the privacy block covers a first shielded region of the display region corresponding to one of the objects of the first application, wherein the first predetermined input signal is a first predetermined touch gesture performed on the touch device, the appearance of the first shielded region is defined by a closed area circled by the first predetermined touch gesture; and
   performing a dynamic adjustment mechanism, wherein the dynamic adjustment mechanism comprises:
      determining whether the first application is being executed in the foreground or background at predetermined time intervals, wherein the main screen of the first application is not visible in the display region and a main screen of a second application is visible in the display region when the first application is in the background; and
      automatically removing the privacy block so as to uncover the first shielded region when the dynamic adjustment mechanism determines that the first application is being executed in the background;
   wherein the step of producing a privacy block in response to the first predetermined input signal further comprises:
      determining a first coordinate in the display region according to the first predetermined input signal, wherein the first coordinate corresponds to the first shielded region of the first application;
      storing the first coordinate;
      using the privacy block to cover the first shielded region based on the first coordinate; and
      setting the appearance of the privacy block according to a selection signal after determining the first coordinate in the display region,
   wherein the dynamic adjustment mechanism further comprises:
      determining whether a second predetermined input signal has been received;
      determining a second coordinate according to the second predetermined input signal for determining a second shielded region; and
      moving the privacy block to the second shielded region based on the second coordinate; and
   wherein the dynamic adjustment mechanism further comprises:
      reading the stored first coordinate when the dynamic adjustment mechanism determines that the first application has been executed in the foreground;
      determining a third coordinate corresponding to the first shielded region according to the stored first coordinate and a current operation to move the main screen of the first application corresponding a slide touch gesture performed on the touch device, wherein movement of the main screen of the first application causes corresponding movement of the plurality of objects of the first application;
      determining whether the third coordinate is in the display region; and
      using the privacy block to re-cover the first shielded region based on the third coordinate when the third coordinate is in the display region.

2. The screen shielding method as claim in claim 1, wherein the dynamic adjustment mechanism further comprising a static adjustment mechanism arranged to fix the privacy block on the first coordinate.

3. The screen shielding method as claim in claim 1, wherein the current operation is a touch signal.

4. The screen shielding method as claim in claim 1, wherein the step of determining whether the first application has been executed in the foreground or background further comprises determining whether the first application has been executed in the foreground or background according to a first process identifier (PID) of the first application.

5. The screen shielding method as claim in claim 1, wherein the privacy block is produced according to the appearance of the closed area.

6. The screen shielding method as claim in claim 1, wherein the second predetermined input signal is a second predetermined touch gesture.

7. The screen shielding method as claim in claim 6, wherein the second predetermined touch gesture is arranged to select and move the privacy block.

8. The screen shielding method as claim in claim 1, wherein the first coordinate is an absolute coordinate of the display region and a relative coordinate of the first application.

9. The screen shielding method as claim in claim 1, wherein the first coordinate is an absolute coordinate of the first application, and a relative coordinate of the display region.

10. An electronic device, arranged to execute a plurality of applications, comprising:
  a display device, having a display region;
  an input device, arranged to receive a first predetermined input signal arranged to enable a first application to enter a privacy protect mode while a first application of the plurality of applications is being executed in the foreground, wherein the input device is a touch device, and the first application comprises a main screen including a plurality of objects;
  a coordinate calculation module, arranged to determine a first coordinate in the display region according to the first predetermined input signal, wherein the first coordinate corresponds to a first shielded region of the display region corresponding to one of the objects of the first application being executed in the foreground, wherein the main screen of the first application occupies the entire display region when the first application is in the foreground;
  a storage device, arranged to store the first coordinate;
  an image processing device, arranged to produce a privacy block and enable the display device to use the privacy block to cover the first shielded region based on the first coordinate for entering a privacy protect mode, wherein the first predetermined input signal is a first predetermined touch gesture performed on the input device, and the appearance of the first shielded region is defined by a closed area circled by the first predetermined touch gesture, wherein the appearance of the privacy block is set according to a selection signal after the first coordinate in the display region is determined; and
  a dynamic adjustment module, arranged to determine whether the first application is being executed in the foreground or background at predetermined time intervals, and cause the display device to automatically remove the privacy block so as to uncover the first shielded region the dynamic adjustment module determines that the first application is being executed in the background, wherein the main screen of the first application is not visible and a main screen of a second application is visible in the display region when the first application is in the background,
  wherein the dynamic adjustment module is further arranged to determine a second coordinate according to a second predetermined input signal for determining a second shielded region and move the privacy block to the second shielded region based on the second coordinate; and
  wherein the dynamic adjustment module is further arranged to read the first coordinate stored in the storage device when the dynamic adjustment module determines that the first application has been executed in the foreground, and enables the coordinate calculation module to determine a third coordinate corresponding to the first shielded region and determine whether the third coordinate is in the display region according to a current operation to move the main screen of the first application corresponding a slide touch gesture performed on the input device, wherein movement of the main screen of the first application causes corresponding movement of the plurality of objects of the first application, and wherein the dynamic adjustment module is further arranged to enable the image processing device to use the privacy block to re-cover the first shielded region based on the third coordinate when the third coordinate is in the display region.

11. The electronic device as claimed in claim 10, wherein the current operation is a touch signal.

12. The electronic device as claimed in claim 10, wherein each of the applications has a process identifier, and the dynamic adjustment module is arranged to determine whether the first application has been executed in the foreground or background according to a first process identifier of the first application at the predetermined time interval.

13. The electronic device as claimed in claim 10, wherein the privacy block is produced according to the appearance of the closed area.

14. The electronic device as claimed in claim 10, wherein the second predetermined input signal is a second predetermined touch gesture.

15. The electronic device as claimed in claim 14, wherein the second predetermined touch gesture is arranged to select and move the privacy block.

16. The electronic device as claimed in claim 10, wherein the first coordinate is an absolute coordinate of the display region and a relative coordinate of the first application.

17. The electronic device as claimed in claim 10, wherein the first coordinate is an absolute coordinate of the first application, and a relative coordinate of the display region.

* * * * *